Jan. 16, 1934.  F. JAMIAS  1,943,973
COOKING UTENSIL
Filed Jan. 11, 1933
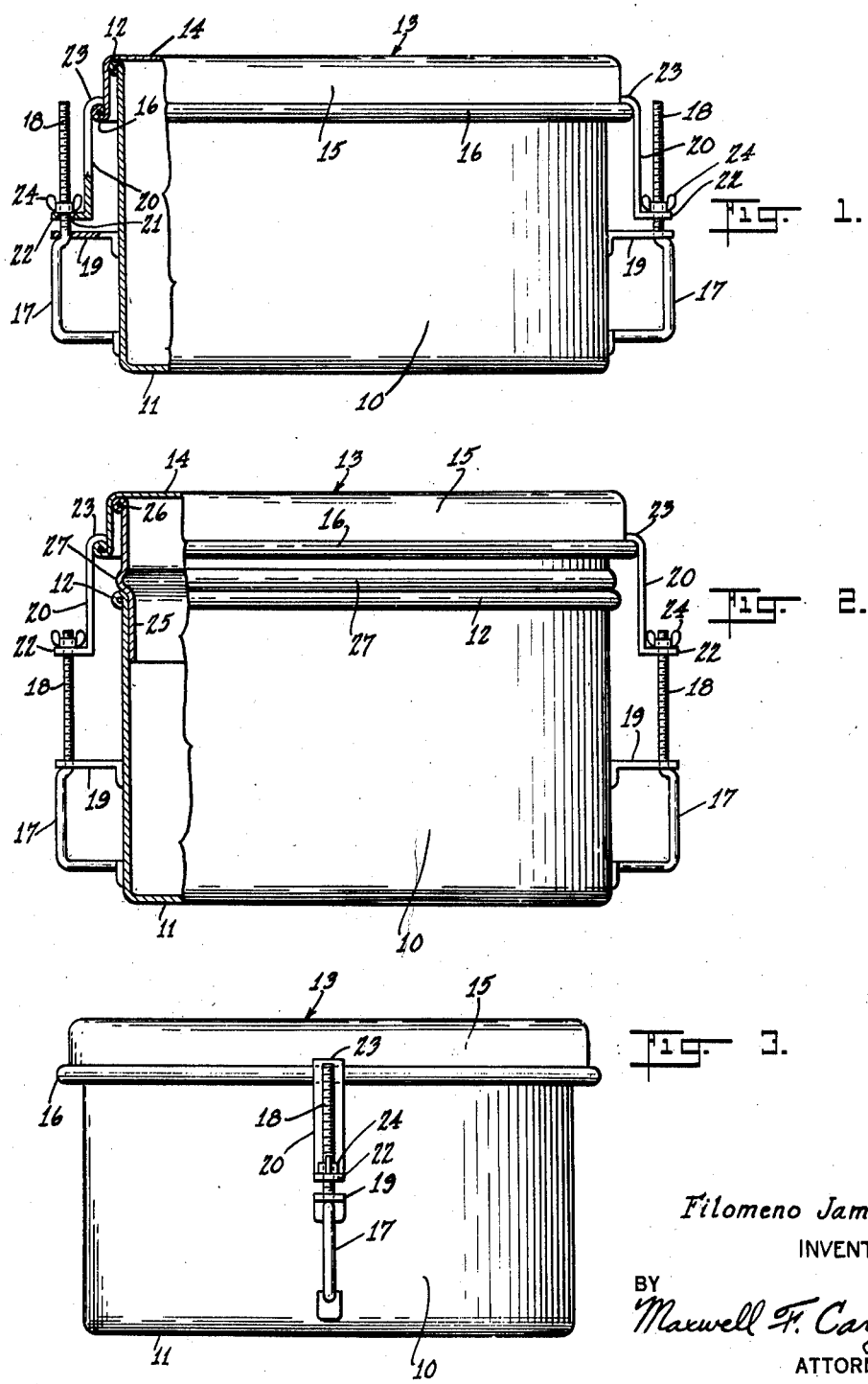
Filomeno Jamias
INVENTOR
BY Maxwell F. Cargill
ATTORNEY

UNITED STATES PATENT OFFICE 1,943,973

COOKING UTENSIL

Filomeno Jamias, Chicago, Ill.

Application January 11, 1933. Serial No. 651,085

2 Claims. (Cl. 53—8)

This invention relates to improvements in cooking utensils.

One object of the invention is to provide a utensil comprising a food holding receptacle and a cover for the same which utensil can be inverted after a period of cooking so that thereafter the greatest heat will be applied to that portion of the food mass which was previously subjected to less heat and was therefore less thoroughly cooked.

Another object of the invention is to provide a utensil which may optionally be provided with a detachable sleeve for increasing the food holding capacity of the utensil.

A further object is to provide a handle for the utensil for convenience in inverting the same, which handle, preferably, has an extension providing a lock for securing the cover to the receptacle or to the above mentioned sleeve when the latter is in use.

Other objects relate to various features of construction and arrangement of parts which will be apparent from a consideration of the following specification and accompanying drawing, wherein:

Figure 1 is a broken view of a structure embodying the invention, showing the handles and locking members in side elevation and partly in section;

Figure 2 is a similar broken elevation of the utensil with a sleeve in position;

Figure 3 is a view of the utensil with a handle shown in front elevation.

In the drawing, a receptacle 10 is shown having a flat bottom 11 and cylindrical side walls which terminate in an open upper end provided with a rolled edge 12. A cover 13, having a flat top 14, and a depending skirt 15 terminating in a rolled edge 16 is provided for closely fitting over the edge 12 as shown in Figure 1.

Secured to the receptacle 10 are handles 17, the upper ends of which comprise threaded rods 18. Brackets 19 are also provided for supporting the handles 17, which brackets, like the lower ends of the handles, may be riveted or welded to the side of the receptacle. A clamp 20 is provided for each rod 18 and has an opening 21 in the horizontal lower end 22 thereof through which the rod passes whereby the clamp can be moved readily lengthwise of the rod. The openings 21 are preferably slightly elongated or slightly over size with respect to the diameter of the rods whereby the clamps can be tilted or swung outwardly sufficiently to permit the release of the upper hooked ends 23 from the roll 16 when it is desired to remove the cover 13. A wing nut 24 is provided for each rod 18 for tightening the clamps 20 to hold the cover securely in place.

In cooking rice with the present improved utensil, the rice is placed in the receptacle 10 and covered with water, the water preferably standing an inch or more above the rice mass. The receptacle may be covered with an ordinary loose pot cover until all or nearly all the unabsorbed water has evaporated. During this stage of the cooking, the rice in the lower portion of the receptacle will be more thoroughly cooked than the rice forming the upper portion of the mass.

The cover 13 of the utensil is then placed on the receptacle and clamped in position. The utensil is then inverted and set back over the fire. The inversion of the pot causes the rice which was least cooked during the first stage of cooking, to lie in the top 13, now constituting the bottom, of the inverted utensil, and hence subjected to more heat than the upper portion of the mass. A short cooking of the inverted mass over a low fire will soon result in the rice being cooked uniformly and without burning or the necessity of stirring.

In Figure 2 of the drawing a sleeve 25 is shown having its lower end positioned in close contact with the inner wall of the receptacle and its upper end terminating in a rolled edge 26 having an exterior diameter equal to the diameter of the roll 12 of the receptacle. This relative dimensioning of the parts permits the same cover 13 to be used on the receptacle or on the sleeve. The sleeve is preferably provided with an outwardly pressed circumferential bead 27 which limits the extent to which the sleeve can be inserted in the receptacle.

The sleeve 25 is employed when the user wishes to cook a large quantity of rice than can be done in the receptacle alone. The sleeve has a close fit with the interior of the receptacle to prevent leakage and when the first stage of the cooking is completed the cover 13 is secured to the sleeve, as illustrated in Figure 2, and the pot inverted and the second stage of the cooking is continued, as above described.

The receptacle may be made of aluminum or any other suitable material, and while it is designed particularly for cooking rice, it may obviously be used for cooking other food products.

While I have shown and described an embodiment of the invention for the purpose of illustration, I do not wish to be restricted specifically thereto except as so limited by the appended claims.

I claim:

1. An invertible cooking utensil for non-liquid foods comprising a receptacle having a bottom and a removable cover each constituting a heat applying surface during the cooking operation, said receptacle and cover defining an unobstructed cooking chamber through which the contents can be transferred bodily by gravity from one end of the chamber to the other to relatively inverted relation with reference to the source of heat upon inverting the utensil, and means for securing said cover to said receptacle to prevent displacement of the former during inversion of the receptacle and subsequent use in inverted position.

2. An invertible cooking utensil for non-liquid foods comprising a receptacle having an open upper end, a detachable sleeve open at both ends adapted to be inserted in said open end of said receptacle in close engagement with the inner wall thereof to increase the capacity thereof, a flat top cover adapted to close the open upper end of said sleeve and constituting a heat applying surface of the utensil when the same is inverted, and means carried by said receptacle for holding said cover and sleeve against displacement from said receptacle when the utensil is inverted to transfer the contents thereof from one end of the interior to the other.

FILOMENO JAMIAS.